Feb. 5, 1963    M. E. RICHTER    3,076,650
TRICYCLE STAND

Filed June 14, 1961    2 Sheets-Sheet 1

Milton E. Richter
INVENTOR.

Feb. 5, 1963
M. E. RICHTER
3,076,650
TRICYCLE STAND
Filed June 14, 1961
2 Sheets-Sheet 2
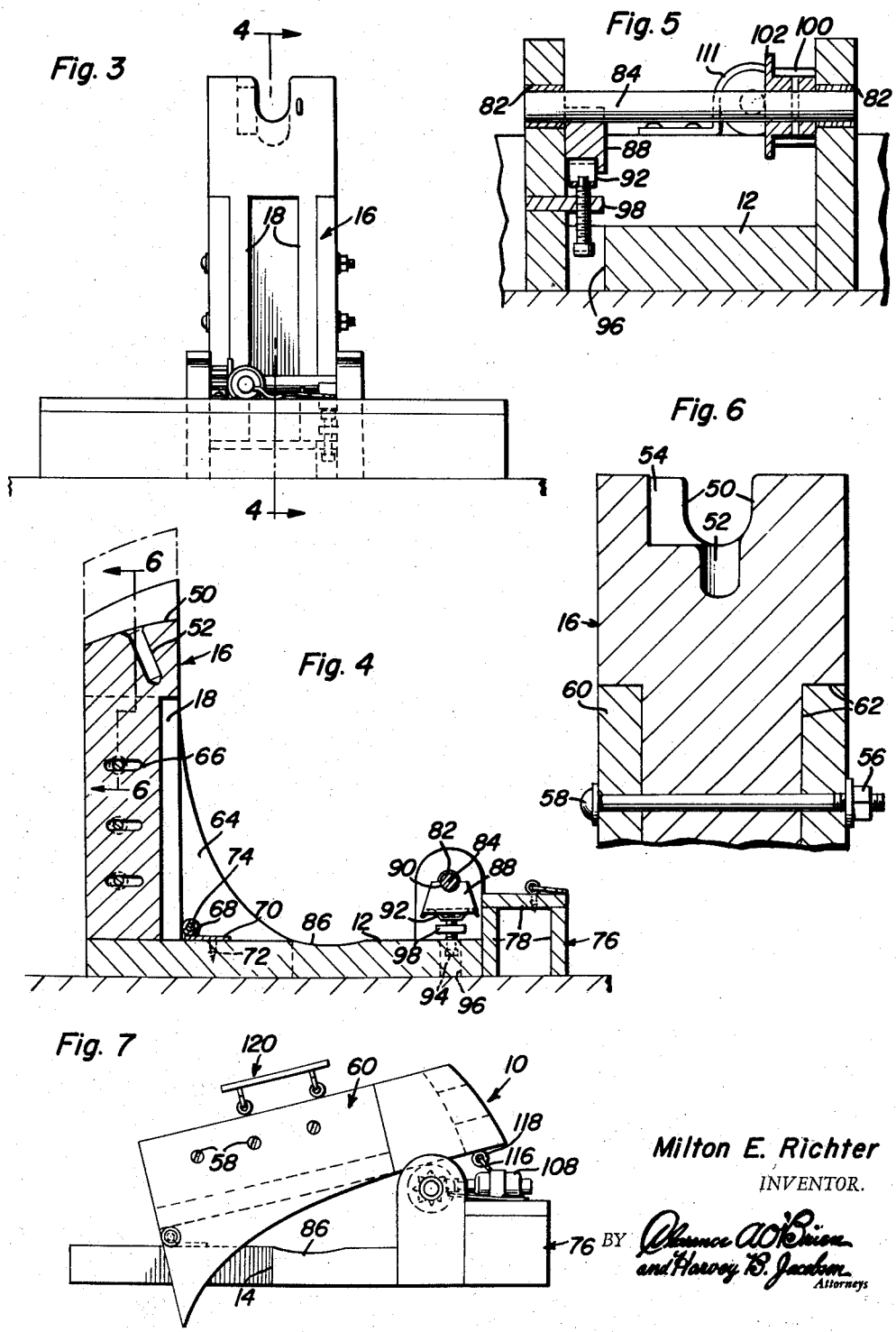
Milton E. Richter
INVENTOR.

United States Patent Office 3,076,650
Patented Feb. 5, 1963

3,076,650
TRICYCLE STAND
Milton E. Richter, 589 N. Wall St., Empire, Oreg.
Filed June 14, 1961, Ser. No. 117,029
8 Claims. (Cl. 272—73)

This invention relates to supporting devices, and more particularly to a stand for supporting manually propelled vehicles.

Briefly, the invention comprises a stand for supporting the front end of a tricycle in such a manner that the front wheel thereof is supported on a roller on the stand. This permits a person to mount the tricycle while it is on the stand, and pedal the front wheel over the roller but without causing the tricycle and stand to move. Also, the steering apparatus of the vehicle may be operated to a limited extent on the stand. The roller is connected to a device which creates a noise similar to that produced by a motor, and a friction brake for creating a resistance to the pedaling action of the operator whereby the person on the trycycle is given the sensation of actually riding the same. The motor noise created by the noise generating device is particularly appealing to children. Preferably, a generator is also connected to the roller which creates additional resistance or drag to the pedalling of the front wheels, and may be used to operate auxiliary apparatus such as horns and lights on the tricycle. The stand is composed of parts hinged together which permits the stand to be folded into a compact unit for transporting the same.

Accordingly, it is the primary object of the invention to provide a stand for supporting manually propelled vehicles in an upright position for display purposes.

It is another object of the invention to provide a stand for supporting tricycles in such a manner that the tricycle may be operated while on the stand without moving.

It is yet another object of the invention to provide a stand for vehicles which is collapsible and readily portable.

It is yet another object of the invention to provide a stand for tricycles which permits operation of the tricycle on the stand during inclement weather when the vehicle cannot be used outdoors, and devices are provided on the stand for creating a resistance to pedalling the wheels of the vehicle whereby the operator is given a sensation of actually riding the vehicle and additionally is subjected to invigorating and healthful exercise.

It is another object of the invention to provide a stand for supporting tricycles in such a manner that it offers prospective purchasers a means of permitting their children to ride the tricycle in a confined area within the store without causing damage or destruction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a front elevational view of the invention;

FIGURE 4 is a vertical cross-sectional view taken substantially on the plane of line 4—4 of FIGURE 3;

FIGURE 5 is a vertical cross sectional view on an enlarged scale taken substantially on the plane of line 5—5 of FIGURE 1;

FIGURE 6 is a vertical cross sectional view on an enlarged scale taken substantially on the plane of line 6—6 of FIGURE 4; and FIGURE 7 is a side view of the invention shown in FIGURE 1, but showing it in a folded position.

Figure 1:
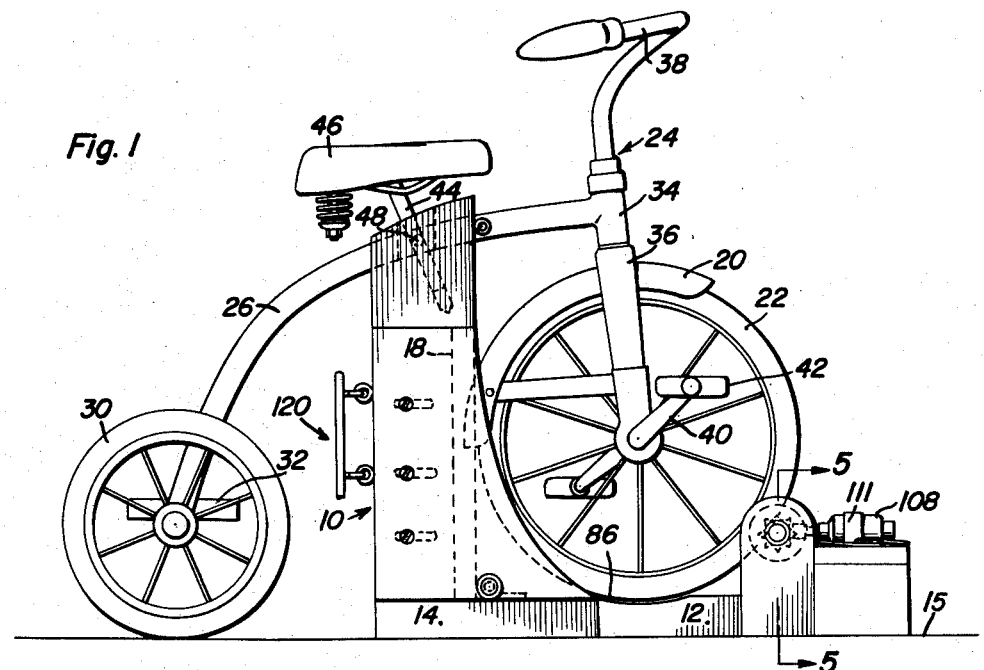
FIGURE 1 is an elevational side view of the invention showing a tricycle mounted thereon.

Referring to the drawings, it can be seen that the tricycle stand 10 comprises a flat base 12 adapted to rest upon a flat surface 15. The base 12 is substantially rectangular in plan, however, it has relatively small rectangular notches 14 formed on the rear portion of each side thereof.

Extending over the rear portion of the base 12 between the notches 14 is a vertically extending post comprising a stud 16 and sideplates 60 which is substantially rectangular in cross section, except for the rectangular vertically extending recess 18 formed in its front face for receiving the front fender 20 and front wheel 22 of the tricycle 24.

As shown in FIGURE 1, the frame 26 of the tricyle extends over the top of the stud 16 and is supported thereon. The tricycle 24 is of conventional construction. Frame 26 is connected to a rear axle 28 on which are journalled the rear wheels 30. A horizontal platform 32 is affixed to the rear end of the frame 26 and supported on the axle 28. The front end of the frame 26 is connected to a vertical sleeve 34 which journals a front wheel fork 36. The fork 36 is connected to a front axle on its lower end which journals the front wheel 22, and is connected to a handle bar for steering the front wheel. The front axle is fixed to cranks 40 which are rotated by pedals 42 driving the front wheel 22. The central portion of the frame 26 has a vertically extending bore therein which is slightly slanted to receive the seat post 44 to which is connected a seat 46. A horizontally extending lock screw 48 is threaded into the side of the frame 26 so as to intersect post 44 and adjustably lock it to the frame 26.

As shown in FIGURES 6 and 4, the upper end of the stud 16 has a U-shaped groove 50 formed therein for receiving the frame 26, and the bottom of this groove is curved longitudinally as shown in FIGURE 4 to fit the contour of the frame. The bottom of the groove intersects a slanted upwardly extending bore 52 which receives the seat post 44 and prevents longitudinal movement between the post and the tricycle frame. One edge of the groove 50 is formed with a recess 54 for receiving the lock screw 48.

Detachably fixed to each side of the post 16 by nuts 56 and bolts 58 are side plates 60. Each side of the post 16 is formed with a rectangular recess 62 for receiving the side plates 60. The side plates 60 are substantially rectangular in shape except for a projecting front portion 64 which is substantially triangular in shape.

The stud 16 has a plurality of horizontal slots 66 extending laterally through it and spaced vertically from one another for receiving the bolts 58. The side plates 60 and corresponding circular bores therein are aligned with the slots 66 which also receive portions of the bolts 58 as shown in FIGURE 6. When the nuts 56 are loosened, the post 16 may be moved back and forth on the bolts 58 for adjusting the longitudinal location of the post to fit various types and sizes of tricycles.

A laterally extending sleeve 68 is secured to the upper surface of the base 12 by means of a plate 70 to which it is welded. The plate 70 has a plurality of conical bores therein which receive wood screws 72 for securing the plate to the base. A pivot pin 74 extends through the sleeve 68 and into aligned bores in the front portion 64 of the side plates 60. This arrangement permits the side plates and posts to be tilted forwardly as illustrated in FIGURE 7 whereby the front ends of the portion 64 extend into the rectangular recesses 14 in the base 12.

Secured to the front end of the base 12 is a stabilizing beam 76 substantially rectangular and U-shape in cross-section. The beam is preferably composed of three plates 78 of equal length and size. It may be secured to the base 12 by conventional means such as screws, or cement.

Secured to the forward portions of the side edges of the base 12 adjacent the beam 76 are two parallel upwardly extending roller support arms 80. The upper ends of these arms have aligned bores containing bushings 82 fixed therein which serve as antifriction bearings for a horizontally extending roller 84 extending between and projecting into the bushings. As shown in FIGURE 1, an arcuate recess 86 is formed at the central portion of the base 12 on its upper surface for receiving the lower periphery of the front wheel 22, and to permit the wheel to contact and be supported on the roller 84.

Figure 2:
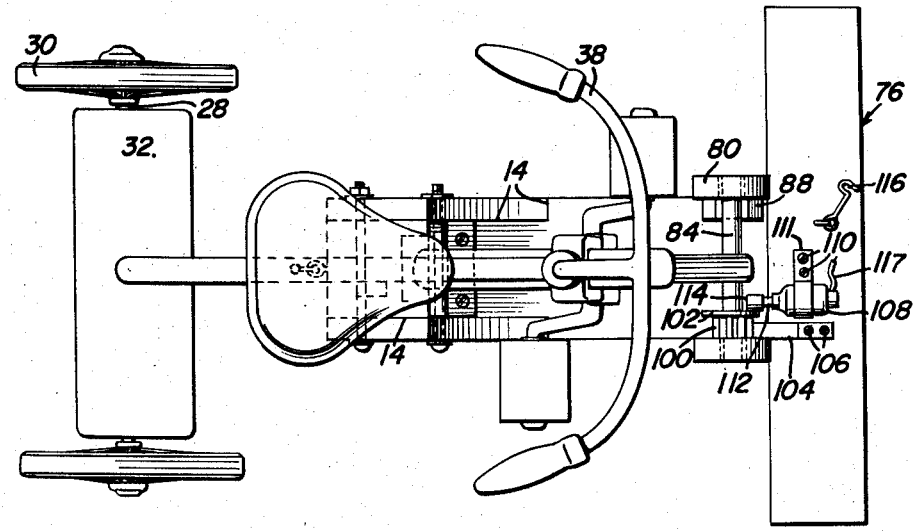
FIGURE 2 is a plan view of the device shown in FIGURE 1.

As shown in FIGURES 2 and 4, a brake shoe 88 has an arcuate recess 90 formed in its upper surface for receiving the roller 84. The brake shoe 88 is continuously urged into engagement with the roller 84 by means of a leaf spring 92 which has a central bore therethrough for receiving a reduced extension of an adjustment screw 94 threaded into the bottom portion of a recessed bore 96 in the base 12. A collar 98 is fixed to the screw 94 for rotating the same. The brake shoe 88 is mounted on the left side of the roller 84, affixed to the right side of the roller is a gear 100 having a radial flange 102 fixed to one side thereof.

A flat member 104 made of spring steel is secured to the upper surface of the beam 76 by screws 106 and has a cantilevered end projecting between the teeth of the gear 100. As the gear 100 rotates, its teeth ratchet over the end of the spring member 104 and create a noise which sounds like a motor that is very amusing and fascinating to children.

A conventional generator 108 is secured by a strap 111 looped therearound and whose ends are secured to beams 76 by means of screws 110. The generator 108 has a rotatable shaft 112 which has a circular knurled knob on its free end engageable with the flange 102. Alternatively, the knob 114 may be made of rubber or some resilient material. In any event, as the roller 84 and its flange 102 rotate, they in turn cause rotation of the knob 114 and shaft 112 of the generator for operating the same. The outlet leads 117 of the generator may be connected to conventional electric apparatus mounted on the tricycle such as horns, lights, etc., not shown. Alternatively, the leads 117 may be connected to any conventional load.

A conventional door hook 116 is pivoted to the central upper surface of the beam 76. A ring 118 is fixed to the upper front portion of the post 16 so that when the post and side plates 60 are pivoted forward on the pivot pin 74, the hook 116 may be inserted into the ring 118 for securing the post in its folded position. A conventional handle assembly 120 is pivoted to the back side of the post in such a location that it lies substantially over the center of gravity of the entire tricycle stand 10 when in the folded position to facilitate easy manual transporting of the device.

In operation, it is only necessary to mount the tricycle 24 on the stand 10 and adjust the stud 16 so as to support the front wheel 22 on the roller 84, and maintain a clearance between the wheel and the base 12 as shown at 86 in FIGURE 1. In addition to being adjustable back and forth as explained above, the post 16 is also adjustable vertically, this is done by removing the bolts 58 and moving the post upwardly a distance equal to the vertical spacing between the slots 66. The bolts are then reinserted and the nuts 56 applied thereto and tightened for securing the post in its new position. Since the seat post 44 projects into the bore 52, the tricycle cannot move longitudinally with respect to the stand.

In operation, a person mounts the vehicle 24 in a conventional manner and rotates the wheel 22 by means of the pedals 42. This causes the wheel 22 to rotate the roller 84 which in turn drives the generator 112 and causes the leaf spring 104 to create a noise resembling a motor. The friction brake shoe 88 creates a drag on the roller which may be adjusted to the desired level. The generator 108 as explained above, may be used for operating auxiliary electrical devices, not shown. If the generator 108 is made of sufficient size, the braking device on the roller may be omitted since the generator will apply sufficient drag thereto.

The main structural members of the stand may be composed of wood, plywood, plastic, light metal, or any other basic molding material sufficient to support the operation and use of a tricycle. The frame could be made by cutting various pieces and assembling them together, or could be cast or molded in one piece.

What is claimed as new is as follows:

1. A tricycle stand comprising a base, a tricycle having a seat structure, an upstanding post mounted on the base supporting the frame of the tricycle, a roller rotatable on a horizontal axis mounted on the base forwardly of said post, said roller contacting the periphery of the front wheel of the tricycle and supporting it above said base, means on the post for preventing movement of the frame relative thereto including a U-shaped slot in the top of the post and a bore extending downwardly from the bottom of the slot, said frame extending through said slot and a portion of said seat structure extending down into said bore.

2. A tricycle stand comprising a base, an upstanding post mounted on the base adapted to support the frame of a tricycle, a roller rotatable on a horizontal axis mounted on the base forwardly of said post, said roller adapted to contact the periphery of a front wheel of the tricycle and support it above said base, means on the post for preventing movement of the frame relative thereto, said means on the post comprising an open U-shaped slot for receiving the frame and a downwardly extending bore communicating with said slot for receiving a seat post on the tricycle frame, said bore being circular in horizontal cross-section.

3. A device as defined in claim 2 wherein said post is pivotally mounted on one end of said base and cooperating means are mounted on said base and post for locking them in a folded position.

4. A vehicle stand comprising a base, an upstanding post mounted on the base adapted to support the frame of a vehicle, a roller rotatable on a horizontal axis mounted on the base forwardly of the post, said roller adapted to contact the periphery of a front wheel of the vehicle and support it above said base, means on the post for preventing horizontal movement of the frame relative thereto, said means on the post comprising a vertical recess for receiving a projection on the vehicle frame, said post being pivotally mounted on said base whereby it may be folded substantially parallel thereto, a continuous brake mounted on said base comprising a friction shoe spring urged into engagement with said roller, a generator mounted on the base having a rotatable armature shaft in driving engagement with said roller, a gear mounted on said roller, resilient noise making means engageable with the teeth of said gear.

5. A device as defined in claim 1 wherein said post has a planar end normal to its longitudinal axis supported on a flat upper surface of said base, a hinge connected to said post and said base, said hinge being located on said upper surface between the post and roller.

6. A device as defined in claim 5 wherein said post comprises two spaced plates connected to said hinge and a stud in the space betwen said plates, the means on the post being on the upper end of said stud, vertical adjusting means connecting said stud to said plates.

7. A device as defined in claim 1 wherein a continuous brake is mounted on said base and includes a friction brake shoe urged by resilient means into engagement with said roller.

8. A tricycle stand as defined in claim 2 wherein said post comprises two spaced plates and a vertical stud between said plates, hinge means connecting said plates to said base, the means on the post being on the upper end of said stud, vertical adjusting means connecting said stud to said plates.

References Cited in the file of this patent

UNITED STATES PATENTS

| | | |
|---|---|---|
| 560,061 | Fox | May 12, 1896 |
| 592,093 | Law | Oct. 19, 1897 |
| 598,791 | Leavitt | Feb. 8, 1898 |
| 2,043,977 | Back | June 16, 1936 |
| 2,534,967 | Hapman | Dec. 19, 1950 |
| 2,609,640 | Newell et al. | Sept. 9, 1952 |
| 2,628,847 | Hawkins | Feb. 17, 1953 |
| 2,668,709 | Boyko | Feb. 9, 1954 |
| 2,738,975 | Zaboy | Mar. 20, 1956 |
| 2,805,860 | Littig | Sept. 10, 1957 |

FOREIGN PATENTS

| | | |
|---|---|---|
| 1,030,931 | France | Mar. 18, 1953 |